US012286816B2

(12) United States Patent
Lin

(10) Patent No.: US 12,286,816 B2
(45) Date of Patent: Apr. 29, 2025

(54) PRESS TYPE DOOR LOCK DEVICE USED IN FIREPROOF DOORS

(71) Applicant: THASE ENTERPRISE CO., LTD., New Taipei (TW)

(72) Inventor: Ching-Tien Lin, New Taipei (TW)

(73) Assignee: THASE ENTERPRISE CO., LTD., New Taipei (TW)

( * ) Notice: Subject to any disclaimer, the term of this patent is extended or adjusted under 35 U.S.C. 154(b) by 180 days.

(21) Appl. No.: 18/300,583

(22) Filed: Apr. 14, 2023

(65) Prior Publication Data

US 2024/0344366 A1 Oct. 17, 2024

(51) Int. Cl.
*E05B 65/10* (2006.01)

(52) U.S. Cl.
CPC ................................ *E05B 65/1053* (2013.01)

(58) Field of Classification Search
CPC ............. E05B 65/1053; E05B 65/1046; E05B 65/104; Y10T 292/0908; Y10T 292/0909; Y10T 292/091; Y10S 292/66
See application file for complete search history.

(56) References Cited

U.S. PATENT DOCUMENTS

| | | | | |
|---|---|---|---|---|
| 4,167,280 | A * | 9/1979 | Godec | E05B 65/1053 70/92 |
| 2011/0215599 | A1 * | 9/2011 | Baragano | E05B 47/00 292/259 R |
| 2018/0245375 | A1 * | 8/2018 | Arlinghaus | E05B 65/108 |

FOREIGN PATENT DOCUMENTS

| | | | | |
|---|---|---|---|---|
| WO | WO-2010018295 | A2 * | 2/2010 | E05B 47/00 |

* cited by examiner

*Primary Examiner* — Kristina R Fulton
*Assistant Examiner* — Christopher F Callahan
(74) *Attorney, Agent, or Firm* — Dority & Manning, P.A.

(57) ABSTRACT

The present disclosure provides a fire door lock mechanism. A handlebar is coupled to one end of an actuator whose the other end is connected with a push rod. A lock bolt is rotatably mounted in a lock cover mount which accommodates a glide mount used to drive the push rod to move horizontally. When the actuator receives a depression force from the handlebar, the actuator is driven to rotate and induces the push rod to move horizontally. By the movement from the push rod, the lock bolt is driven to rotate to engage or disengage the lock mechanism. A partition and a fire piece are coupled to the glide mount. The fire piece melts at a high temperature during a fire, making the partition moved by a force from an elastic member connected thereto and cause the lock bolt to be engaged with the partition and maintained in a locked state.

19 Claims, 9 Drawing Sheets

PRESS TYPE DOOR LOCK DEVICE USED IN FIREPROOF DOORS

BACKGROUND

1. Technical Field

The present invention relates to fire door lock mechanisms, and more particularly, to a fire door lock mechanism having a handlebar which can be vertically operated with respect to a fire door mounted with the fire door lock mechanism to thereby drive a lock bolt to open the fire door.

2. Description of Related Art

A conventional fire door, as shown in FIG. 1, is opened by depressing a handlebar 11 of a handlebar mount 10 horizontally located in the middle of the fire door, whereby a lock bolt 12*d* in a lock body 12 is retracted and relieves a locked state that closes and locks the fire door, thereby making the fire door opened. This operation is achieved by a diagonal depression motion of the handlebar 11 which is depressed by a user to move in a downward and diagonal direction. Please refer to FIGS. 2 and 3 which shown the structure of a conventional fire door lock being rotated by 90 degrees to be oriented in a horizontal direction for clear illustration. The handlebar mount 10 houses a handlebar 11 that allows a user to depress downwards and a lock body 12 that accommodates a lock bolt 12*d*. The handlebar 11 is screwed to two horseshoes 13 located at the bottom of the handlebar mount 10. A roller 13*b* penetrates through two slanted slots 13*a* respectively formed on two side walls of each horseshoe 13 and is fixed to the side walls of the horseshoe 13 by means of a shim 13*c*. A pin 13*e* having a wound elastic member 13*d* thereon is secured to the bottom of each horseshoe 13, wherein one end of the elastic member 13*d* is in contact with the bottom of the roller 13*b* on which an upward compression force is exerted. Under a normal condition, the shim 13*c* of the roller 13*b* holds the handlebar 11 in position at the top of the handlebar mount 10. When the user exerts a force on the handlebar 11, the roller 13*b* is pushed downwards and travels along the slots 13*a* of each horseshoe 13 by the force, thereby inducing diagonal translocation of the handlebar 11 in the handlebar mount 10. The lock body 12 located at the front of the handlebar mount 10, shown in FIG. 3, comprises a seesaw lever 12*a* which is constructed by coupling a push part 12*b* and a pull part 12*c*, wherein the push part 12*b* is in contact with an inside surface of the handlebar 11 and the pull part 12*c* is engaged with a cavity 12*e* formed by the lock bolt 12*d* in the lock body 12. When the user depresses the handlebar 11, the push part 12*b* of the lever 12*a* is pushed downwards while the pull part 12*c* is moved upwards. At the same time, the pull part 12*c* comes into contact with the lock bolt 12*d* which is driven to rotate in a counterclockwise direction, making the lock bolt 12*d* retracted into the lock body 12 to facilitate a door opening action.

In view of the above door opening operation in the use of the conventional fire door lock, although the user depresses the handlebar 11 in a manner as illustrated by the arrow in FIG. 3, the handlebar 11 is moved in a diagonal direction by the roller 13*b* travelling along the slots 13*a* of each horseshoe 13 in the handlebar mount 10. The diagonal movement of the handlebar 11 is composed of a vertical movement and a horizontal movement. And, the force exerted by the user is undesirably divided into two components: a force vertical to the push part 12*b* and used for operating the lock bolt 12*d*, and a force horizontal to the push part 12*b* and having no contribution to the lock bolt 12*d*, which therefore requires a larger amount of force exerted by the user due to wastage. Further, the horizontal movement of the handlebar 11 makes the travel direction of the handlebar 11 different from that of the hands of the user, which causes discomfort to the hands of the user when operating the door lock.

Besides, when the above conventional door lock is in use, due to no provision of elements for a fire security purpose, therefore the door lock is not allowed to prevent the relief of a locked state during a fire, making users who are not aware of the fire still able to open the fire door and thus in danger, and also making the fire undesirably spread through the opened fire door to other unintended places. This is the problem to be here solved.

SUMMARY

An objective of the present invention is to provide a fire door lock mechanism which allows users to depress a handlebar in a vertical direction with respect to a first door mounted with the fire door lock mechanism to activate a lock bolt in a comfortable manner to open the first door.

Another objective of the invention is to provide a fire door lock mechanism which allows the fire door lock mechanism to automatically remain in a locked state when a high temperature is detected during a fire, making a fire door mounted with the fire door lock mechanism unable to be opened to prevent the fire from hurting people and spreading.

In accordance with the above and other objectives, the present invention provides a fire door lock mechanism, comprising a body mounted on a fire door and formed with a handlebar and a drive mechanism operationally associated with the handlebar, for allowing a user to depress the handlebar to disengage the fire door lock mechanism; an actuator rotatably mounted in the handlebar and bent to form a central portion and two end portions; a push rod coupled to one of the end portions of the actuator; a glide mount coupled to one end of the push rod to receive motion from the push rod; a lock bolt coupled to the glide mount to receive motion from the glide mount; and a door bolt assembly used to engage and disengage a door bolt of the fire door, and connected to another end of the push rod relatively far away from the glide mount, wherein the door bolt assembly comprises a carrier, a pivot member rotatably disposed on the carrier, an operation member penetrating through the pivot member, and a holding member disposed between the pivot member and the operation member, and wherein the pivot member is rotatably pivoted to the push rod by a rack portion integrally formed on the pivot member.

The body comprises a lock shell and a handlebar mount, the lock shell for accommodating components of the drive mechanism. A bottom of the lock shell is coupled to a mount plate and a base plate, and the handlebar mount is formed with a recess for receiving the base plate whose two ends are each provided with a first horseshoe. A second horseshoe is provided at each two ends of a bottom of the handlebar. One end portion of the actuator is coupled to a bottom hole of the second horseshoe, and the central portion of the actuator is coupled to a top hole of the first horseshoe, while the other end portion of the actuator is connected to the push rod. When one end portion of the actuator receives a force from depression of the handlebar, the actuator rotates about the hole of the first horseshoe and causes the push rod to move in a horizontal direction to perform an engage or disengage operation of the door lock.

Moreover, the lock bolt can be rotatably disposed in a lock cover mount which accommodates the glide mount that drives the lock bolt to move horizontally. An elliptic slot is formed at a front side of the glide mount, and a pin is inserted into the slot to couple the glide mount to the lock bolt. A rear side of the glide mount is coupled to a link arm that is secured to the push rod by a shim. Therefore, by depression of the handlebar, the lock bolt can be driven by the push rod to rotate to engage or disengage the door lock mechanism.

Furthermore, a partition having a protruding arm and a fire piece are coupled to the glide mount. The fire piece melts at a high temperature during a fire, making the partition shifted upwards by means of a force from an elastic member connected thereto and engaged with the lock bolt, such that the door lock mechanism is maintained in a locked state and cannot be disengaged by depressing the handlebar, thereby facilitating the fire security and safety.

BRIEF DESCRIPTION OF THE DRAWINGS

The present invention can be more fully understood by reading the following detailed description of the preferred embodiments, with reference made to the accompanying drawings, wherein.

DETAILED DESCRIPTION

Figure 1:
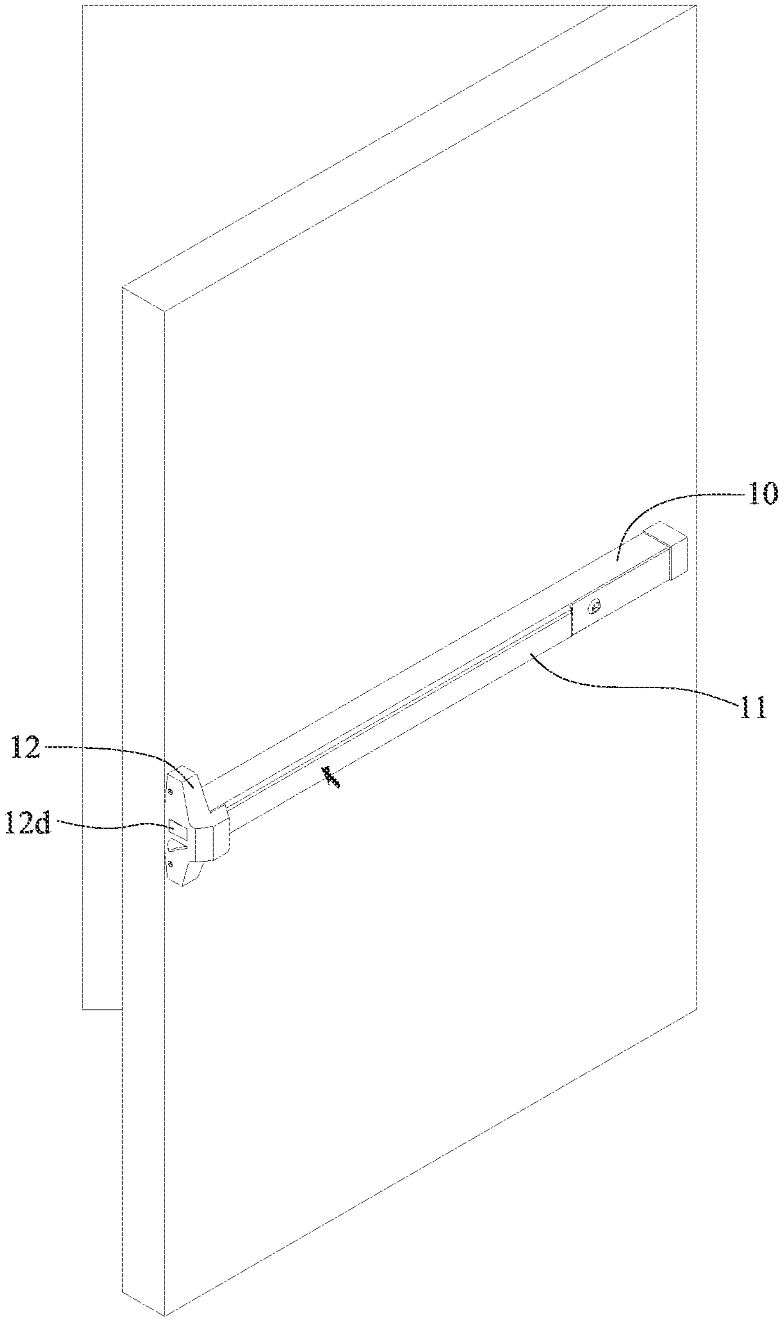
FIG. 1 (PRIOR ART)
FIG. 1 is a schematic diagram of a fire door mounted with a conventional fire door lock.
Figure 2:
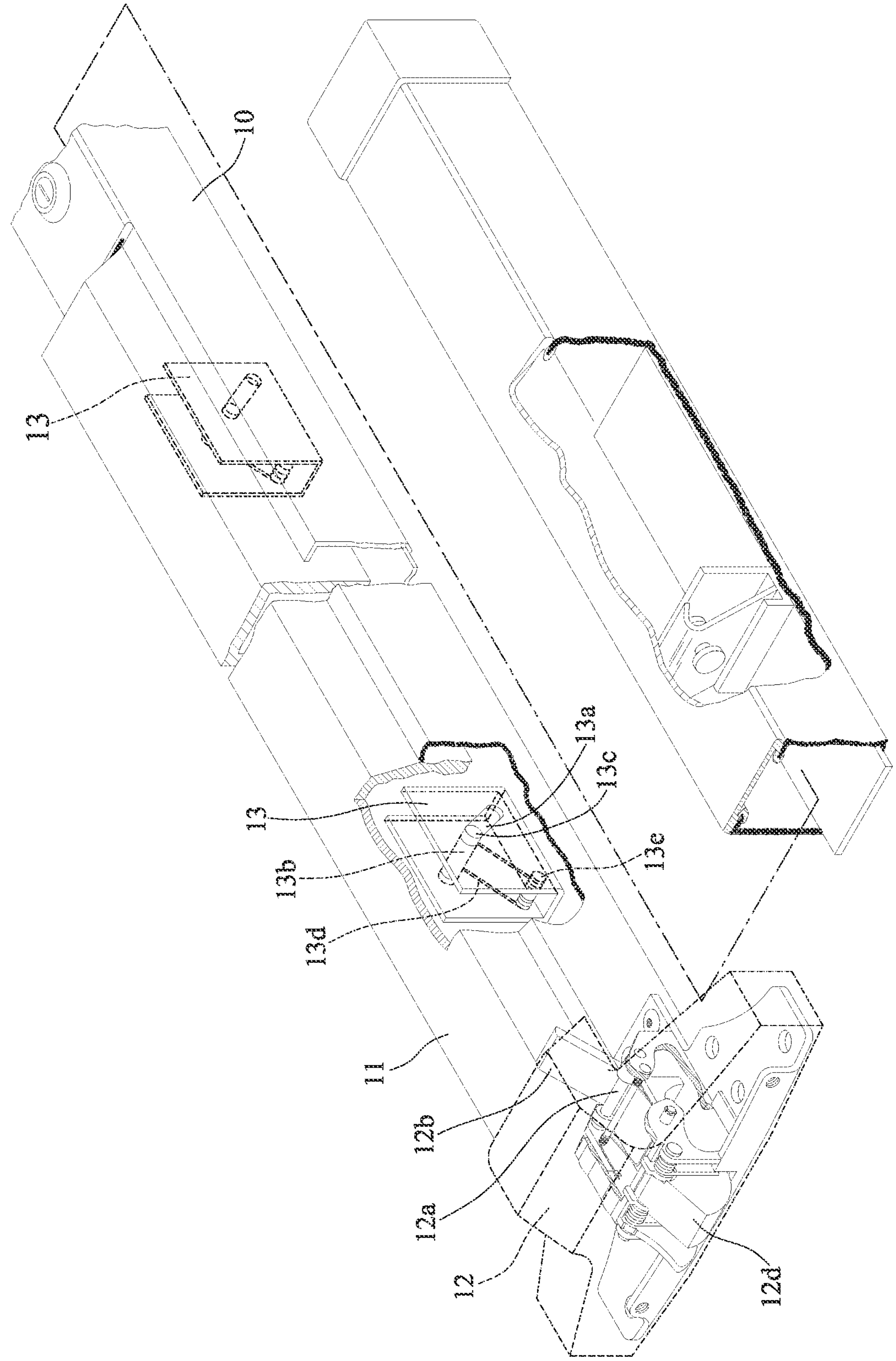
FIG. 2 (PRIOR ART)
FIG. 2 is a schematic diagram showing the structure of the conventional fire door lock.
Figure 3:
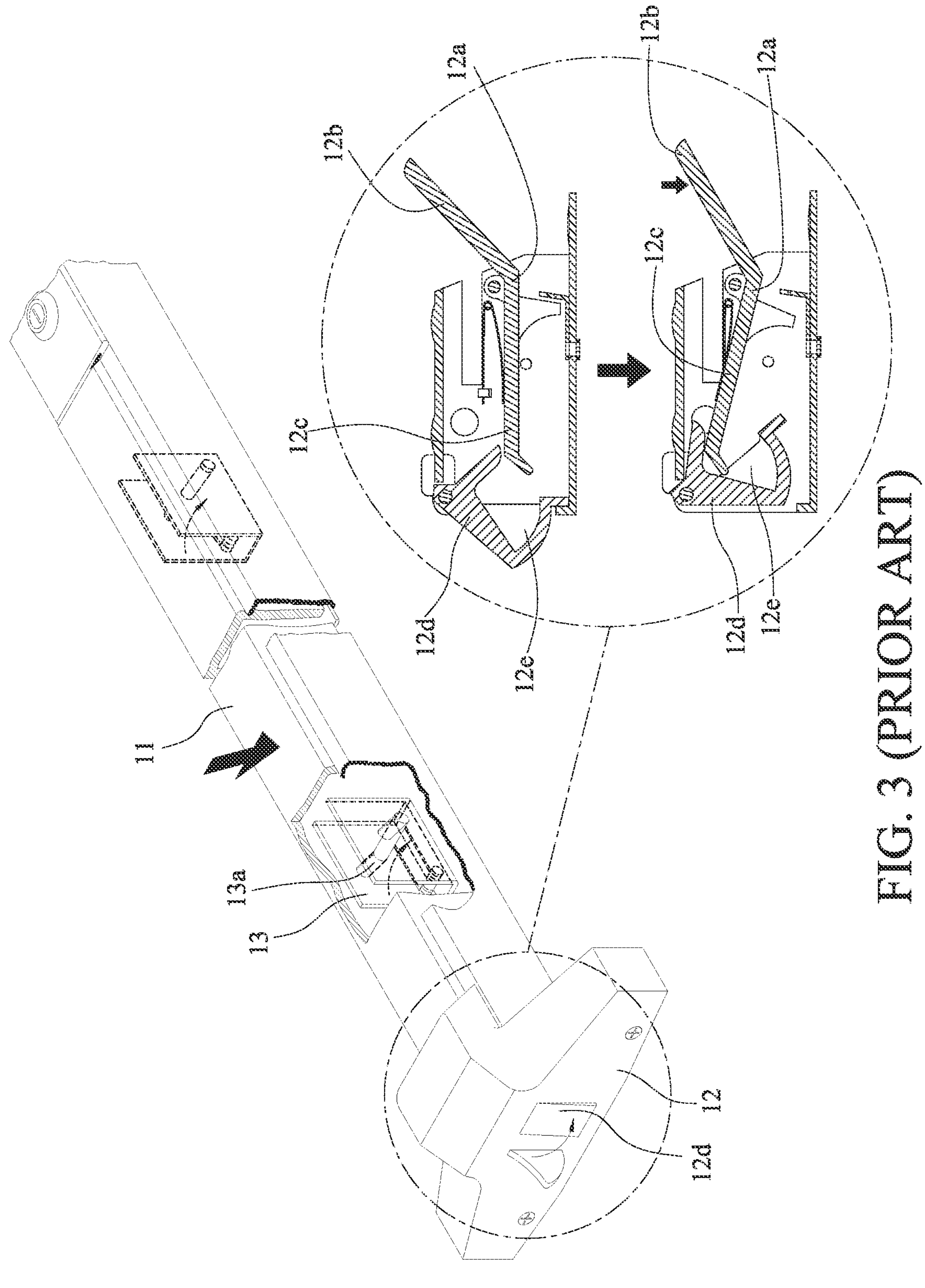
FIG. 3 (PRIOR ART)
FIG. 3 is a schematic diagram showing the mechanics of the conventional fire door lock.

Implementations of the present disclosure are described below by specific embodiments. Other advantages and technical effects of the present disclosure can be readily understood by one of ordinary skill in the art upon reading the disclosure of this specification.

It should be noted that the structures, ratios, sizes shown in the drawings appended to this specification are provided in conjunction with the disclosure of this specification in order to facilitate understanding by those skilled in the art. They are not meant, in any ways, to limit the implementations of the present disclosure, and therefore have no substantial technical meaning. Without influencing the effects created and objectives achieved by the present disclosure, any modifications, changes or adjustments to the structures, ratios or sizes are construed as fall within the scope covered by the technical contents disclosed herein. Meanwhile, terms such as "above," "one" and the like, are for illustrative purposes, and are not meant to limit the scope implementable by the present disclosure. Any changes or adjustments made to the relative relationships, without substantially modifying the technical contents, are also to be construed as within the scope implementable by the present disclosure.

Please refer to FIGS. 4A to 4D showing the main structure of a fire door lock mechanism proposed by the present invention. This fire door lock mechanism comprises: a body 2 formed with a handlebar 25 and mounted on a fire door (not shown); at least one actuator 27 provided in the handlebar 25; a push rod 28 coupled to one end of the actuator 27; a glide mount 30 coupled to one end of the push rod 28 and for receiving the movement of the push rod 28; and a lock bolt 33 coupled to the glide mount 30 and driven to move by the glide mount 30. A door bolt assembly 3 is connected to the other end of the push rod 28, for locking or unlocking a door bolt of the fire door.

The body 2 comprises a lock shell 20 and a handlebar mount 23, wherein the lock shell 20 accommodates all the components constituting a lock bolt drive mechanism. The bottom of the lock shell 20 is coupled to a mount plate 21 and a base plate 22. The handlebar mount 23 is formed with a recess for receiving the base plate 22 whose two ends are each provided with a first horseshoe 24 having a hole 24*a* on a top side thereof.

The handlebar 25, mounted in the handlebar mount 23, can be depressed by a user to open the fire door and moved in a vertical direction with respect to the fire door. A second horseshoe 26 is provided at each two ends of the bottom of the handlebar 25 and formed with a hole 26*a* penetrating therethrough.

The actuator 27 is coupled to each first horseshoe 24 at a right angle. The actuator 27 is constructed of a central portion 27*a*, a left portion 27*b*, and a right portion 27*c*, each portion having a hole 27*d*, 27*e*, and 27*f* respectively.

The push rod 28 is in an elongated shape, wherein a shim 28*b* penetrates through each two ends of the push rod 28 to be coupled to the hole 27*e* of the left portion 27*b* of the actuator 27. One end of the push rod 28 is connected with a link arm 29 used for receiving the movement of the push rod 28 to generate a horizontal force.

The glide mount 30 is coupled to one end of the link arm 29 by means of a shim 29*a* and is adapted to move horizontally by to the horizontal force from the link arm 29 connected with the push rod 28. A lock cover mount 31 can be located over the glide mount 30, for receiving the horizontal movement of the glide mount 30, making the glide mount 30 driven by the motion of the push rod 28 to glide back and forth in the lock cover mount 31.

The lock bolt 33 is coupled to the glide mount 30 by a pin 31*d* and pivotally secured to the lock cover mount 31. The lock bolt 33 is driven by the glide mount 30 to move to induce a locked state of the fire door lock mechanism. A partition 34 can be disposed in the glide mount 30 and has an arm 34*a* protruding from one side of the partition 34. The center of the partition 34 is connected with one end of an elastic member such as a spring 34*b*, and the other end of the spring 34*b* is coupled to a pin 31*e* located at the top of the inside of the lock cover mount 31. A pin 31*a*, which penetrates through the glide mount 30 and pivoted to the lock cover mount 31, is inserted into the partition 34 for coupling the partition 24 to the glide mount 30 and lock cover mount 31, such that the partition 34 can move up and down along the pin 31*a*. By the coordination of the aforementioned components of the fire door lock mechanism, the user can easily and vertically depress the handle 25 with respect to the fire door to disengage the locked state and open the fire door in a comfortable manner.

Figure 4A:
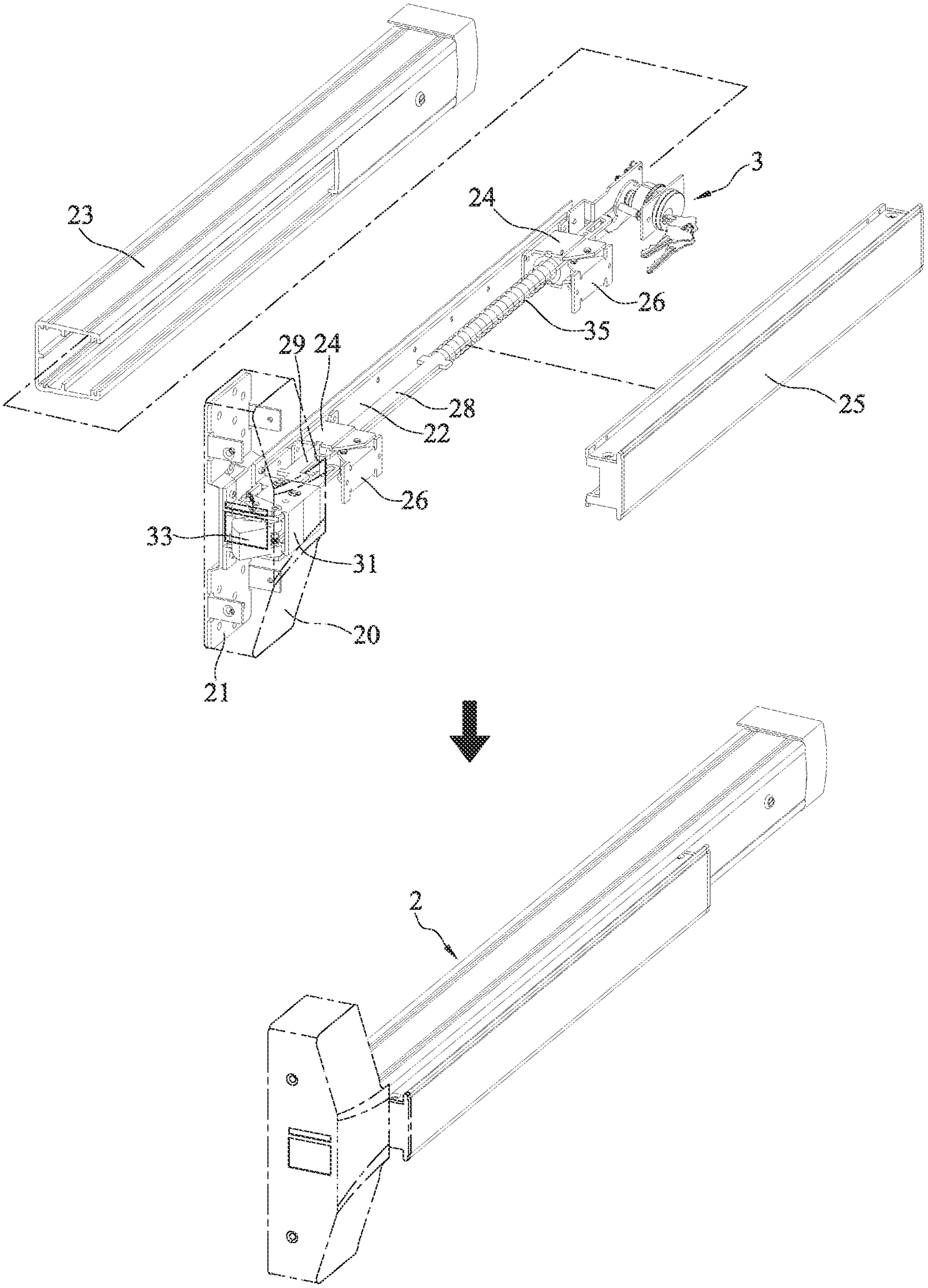
FIGS. 4A to 4D are schematic diagrams showing the structure of a fire door lock mechanism according to a preferred embodiment of the invention.
Figure 4B:
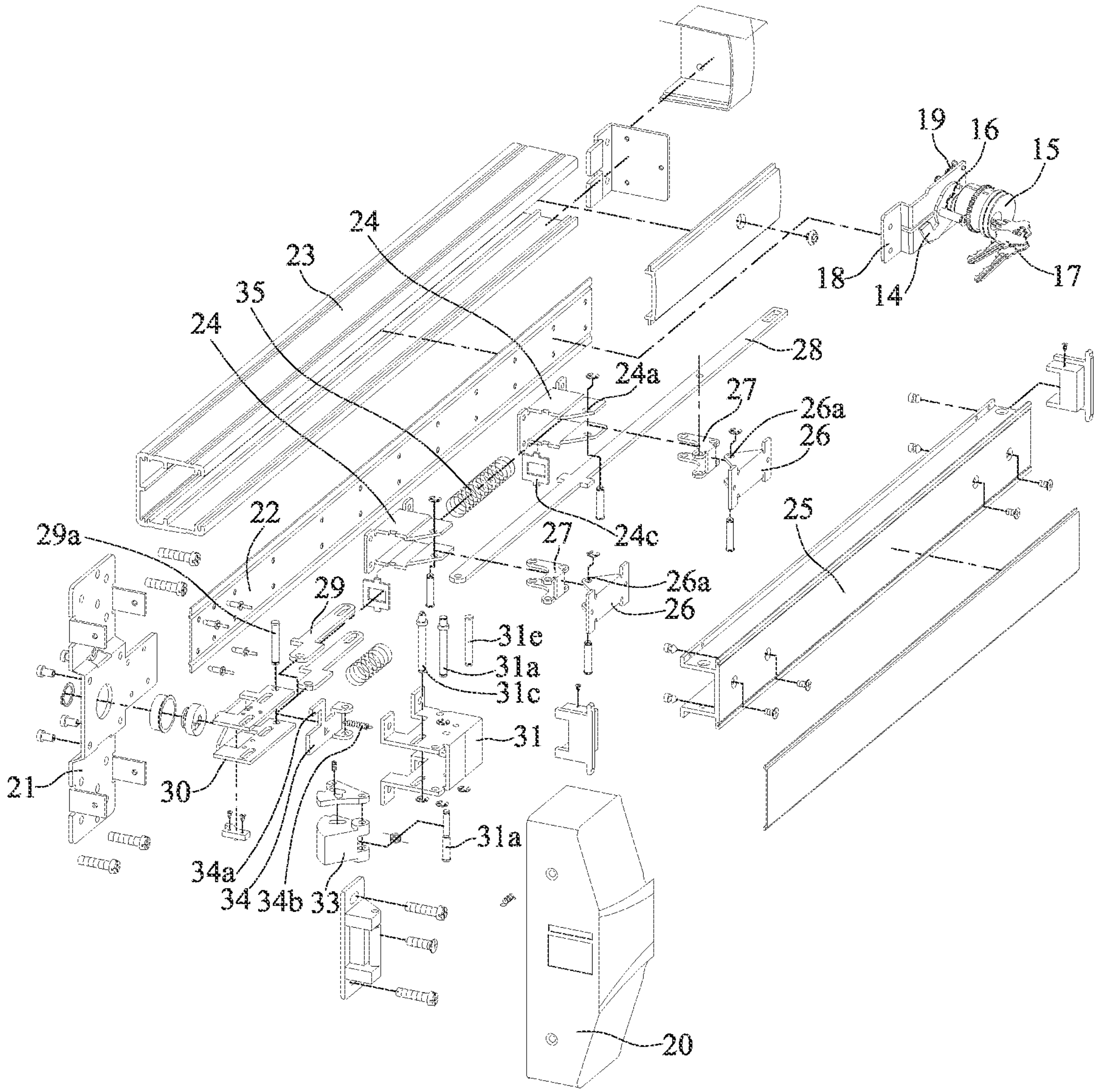
Figure 4C:
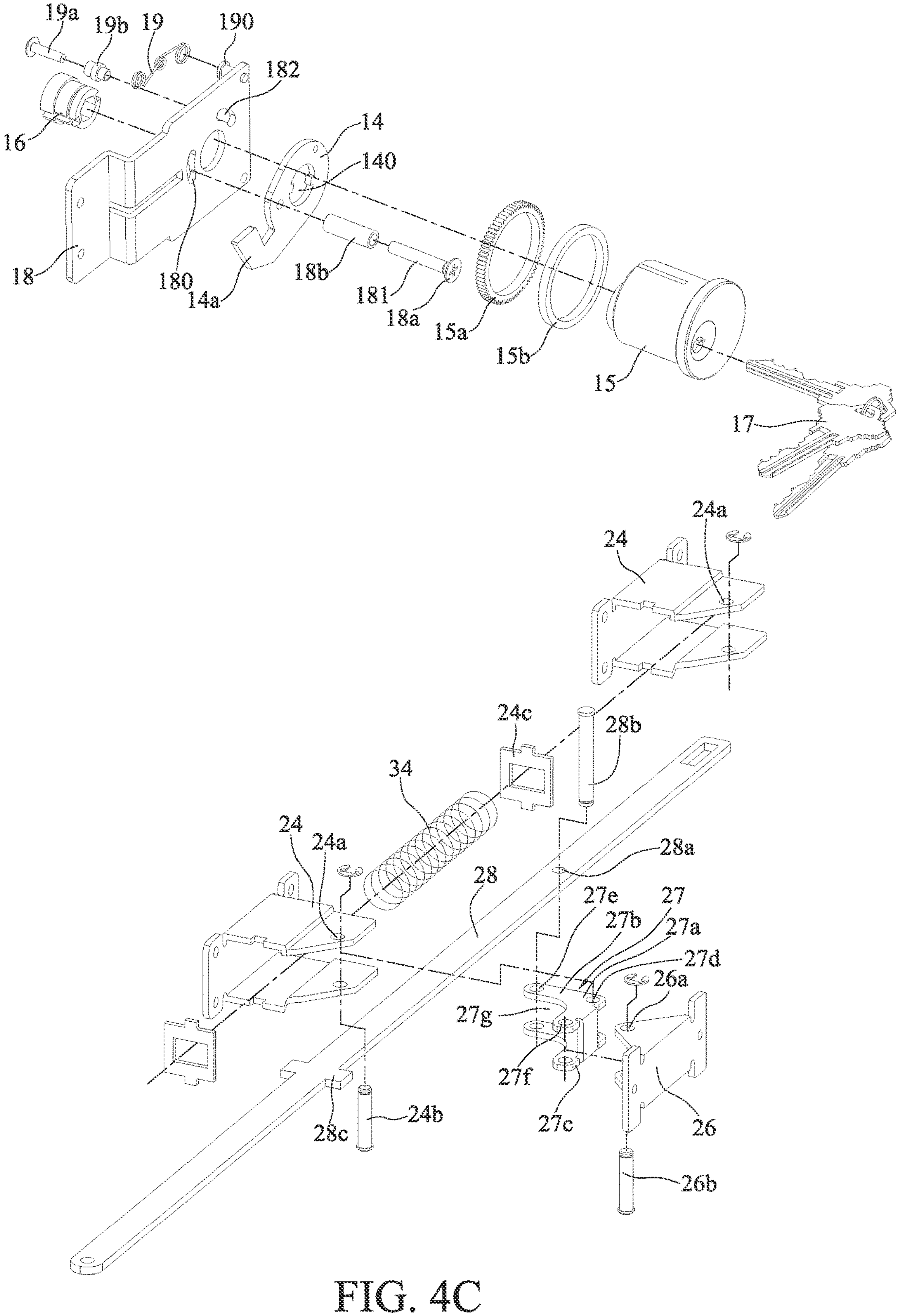
Figure 5:
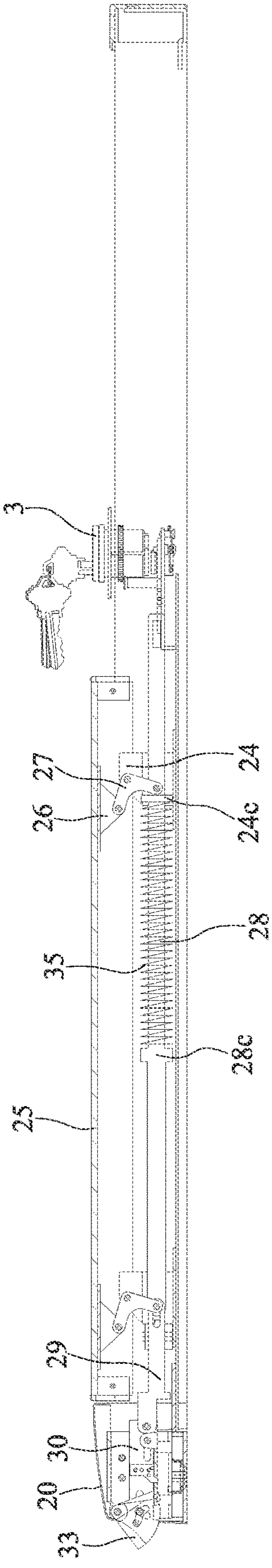
FIG. 5 is a schematic diagram showing the mechanics of the fire door lock mechanism according to the invention.
Figure 6:
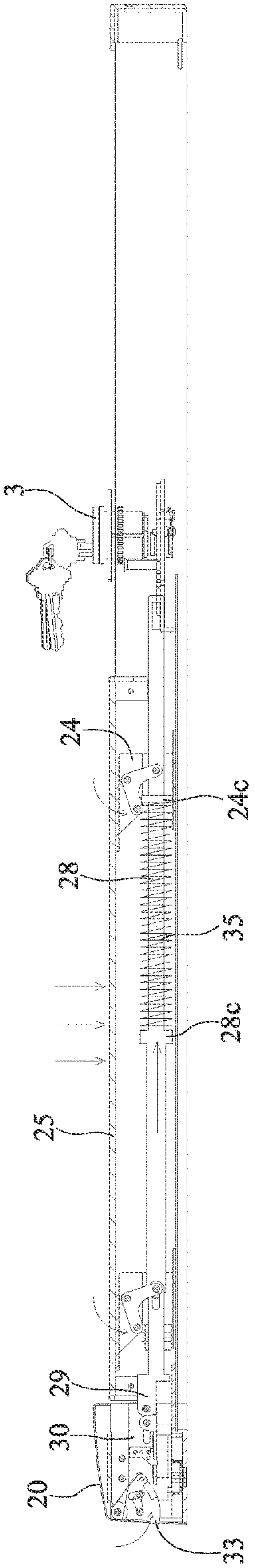
FIG. 6 is another schematic diagram showing the mechanics of the fire door lock mechanism according to the invention.

Further as shown in FIG. 4C, the second horseshoe 26 is located at each two ends of the inside of the handlebar 25 and is formed with a hole 26*a* penetrating therethrough. The hole 26*a* is engaged with a shim 26*b* inserted into the hole 27*f* of the right portion 27*c* of the actuator 27, making the shim 26*b* act as a pivot to allow the actuator 27 to move. A recess portion 27*g* is formed on the actuator 27 to be bridged over the push rod. A shim 24*b* is inserted into the hole 27*d* of the central portion 27*a* of the actuator 27 and the hole 24*a* of the first horseshoe 24 for connecting the actuator 27 and first horseshoe 24. The actuator 27 is further connected to the push rod 28 by a shim 28*b* inserted into the hole 27*e* of the left portion 27*b* of the actuator 27 and the hole 28*a* of the push rod 28. As shown in FIGS. 5 and 6, when the second horseshoe 26 is moved downwards by a force exerted from the handlebar 25, the left portion 27*b* of the actuator 27 would be accordingly driven to move downwards, making the right portion 27*c* of the actuator 27 rotate about the shim 24*b* that is inserted into the hole 24*a* of the first horseshoe 24 and acts as a pivot, which thereby generates a horizontal movement of the push rod 28 and of the link arm 29 and glide mount 30 simultaneously that are coupled to the push rod 28. As a result, the lock bolt 33 in the glide mount 30 moves in accordance with the movement of the glide mount 30 and is retracted into the lock shell 20 to complete the lock disengage operation.

A wing 28*c* is substantially formed at a central portion of the push rod 28 for securing one end of an anti-push spring 35 which is sleeved about the push rod 28 and whose the other end is coupled to a stopper plate 24*c* engaged with the first horseshoe 24. Therefore, when the user is no longer exerting a force on the handlebar 25, as shown in FIG. 5, the compression of the anti-push spring 35 is released and causes the push rod 28 to move horizontally to return to the original starting position, which accordingly induces a horizontal movement of the link arm 29 and glide mount 30 that are coupled to the push rod 28, such that the lock bolt 33 in the glide mount 30 rotates in accordance with the movement of the glide mount 30 and extends out of the lock shell 20 to complete the lock engage operation.

Figure 4D:
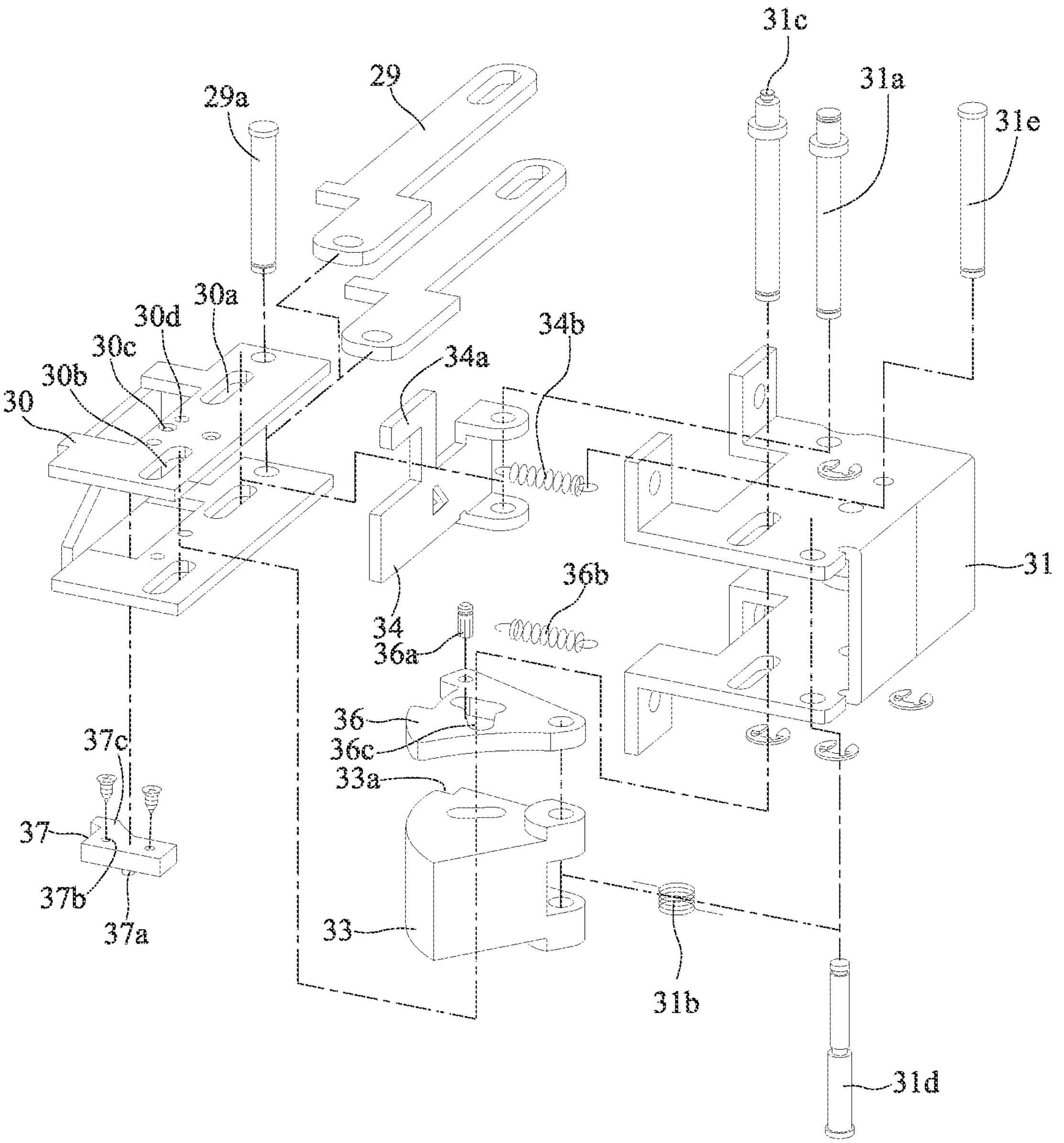

As shown in FIGS. 4B and 4C, the lock cover mount 31 is coupled to the glide mount 30 and the mount plate 21, making the glide mount 30 slide back and forth on the surface of the mount plate 21. As shown in FIG. 4D, the glide mount 30 has an elliptic slot 30*a* located at a right side thereof, allowing the pin 31*a* to penetrate through the slot 30*a* to couple the glide mount 30 to the lock cover mount 31, such that the glide mount 30 can move horizontally back and forth within the lock cover mount 31. Moreover, the glide mount 30 further has an elliptic slot 30*b* located at a left side thereof, allowing a pin 31*c* to penetrate through the slot 30*b* and couple the glide mount 30, a substantially triangular-shaped safety plate 36 and the lock bolt 33 to the lock cover mount 31, wherein the safety plate 36 is further pivoted to the lock cover mount 31 by means of the pin 31*d*, and the lock bolt 33 is received within the lock cover mount 31. The pin 31*d* further penetrates through the lock bolt 33 and is coupled to a coil spring 31*b*. One end of the coil spring 31*b* abuts against the top of the lock cover mount 31, and the other end of the coil spring 31*b* generates a resilient force on the lock bolt 33, such that the lock bolt 33 is extended outwards by the resilient force under a normal condition.

Furthermore, the partition 34 located in the glide mount 30 is coupled to the lock cover mount 31 by the pin 31*a*, wherein the center of the partition 34 is connected with one end of the spring 34*b*, and the other end of the spring 34*b* is coupled to the pin 31*e* of the lock cover mount 31, making the partition 34 moved upwards by a resilient force from the spring 34*b*. Moreover, the arm 34*a* protruding from a side of the partition 34 is in contact with one end of a pillar 36*a* penetrating through the safety plate 36, and the other end of the pillar 36*a* is coupled one end of a spring 36*b* whose the other end is connected to the pin 31*d* that couples the glide mount 30 and the safety plate 36 to the lock cover mount 31. The pin 31*d* protrudes from an arc-shaped opening 36*c* of the safety plate 36. By a resilient force from the spring 36*b*, the safety plate 36 is moved forwards, and at this moment one end of the pillar 36*a* in the partition 34 abuts against the partition 34 which is accordingly shifted downwards. When the safety plate 36 is in touch with a frame wall of the fire door which is in a closed state, the safety plate 36 moves backwards making an end thereof not in contact with the partition 34, such that the partition 34 can shift upwards whose front end abuts against an end of a recess portion 33*a* of the lock bolt 33, making the lock bolt 33 secured in position and not able to retract into the body shell 20, such that the locked state is maintained for the safety purpose.

In addition, a hole 30*c* and a threaded hole 30*d* are formed on sides of the glide mount 30 for coupling a fire piece 37 which is made of a heat-melting material and which is formed with a pillar 37*a* thereon inserted into the hole 30*c* to secure the fire piece 37 in position. A screw is inserted into a hole 37*b* of the fire piece 37 and the threaded hole 30*d* to couple the fire piece 37 to the glide mount 30. The fire piece 37 is further formed with a protrusion 37*c* having a slanted surface to come into contact with the arm 34*a* of the partition 34. When the glide mount 30 is moved backwards by the push rod 28, the fire piece 37 would accordingly move backwards, and the protrusion of the fire piece 37 makes the partition 34 move downwards such that the lock bolt 33 is not engaged. Therefore, the lock bolt 33 can be moved backwards by the glide mount 30 to achieve the lock disengage operation.

During a fire, when the fire door lock mechanism is exposed to the fire, the fire piece 37 melts by a high temperature of the fire and is thus not able to contact the arm 34*a* of the partition 34. The partition 34 is shifted upwards by the resilient force from the spring 34*b*, making the front end of the partition 34 engaged with the recess portion 33*a* of the lock bolt 33. As a result, the lock bolt 33 cannot be pulled backwards by the movement of the glide mount 30, and thus the fire door is maintained in a closed state and cannot be opened so as to prevent unaware people from opening the fire door and being attacked by the fire and prevent the fire from spreading to other unintended area, thereby facilitating the fire security and safety.

As shown in FIG. 4B and FIG. 4C, the door bolt assembly 3 comprises a carrier 18, a pivot member 14, an operation member 15, and a holding member 16. The door bolt assembly 3 is connected to the end, relatively far away from the glide mount 30, of the push rod 28. The pivot member 14 is rotatably pivoted to the push rod 28 by a rack portion 14*a* integrally formed on the pivot member 14. The pivot member 14 is shaped like the number "9" and is joined with an arc groove 182 of the carrier 18 by an elastic structure. The elastic structure includes a spring 19, a fixed component 190 connecting with the carrier 18 and one end of the spring 19, and another fixed component (e.g., screw 19*a* and/or nut 19*b*) connecting with the pivot member 14 and the other end of the spring 19. The operation member 15, such as a lock member, is coaxial with the pivot member 14 and coupled to a hole 140 of the pivot member 14. A gear ring 15*a* is disposed on the operation member 15, and a non-slip ring 15*b* (e.g., a bearing) is disposed on the operation member 15 to avoid the operation member 15 from moving straightly. The holding member 16 maintains axial extension of the operation member 15 and the pivot member 14. The carrier 18 has an arc recess 180 for accommodating one end of an acting rod 181, and the other end of the acting rod 181 has a cap 18*a*. A positioning rod 18*b* is disposed between the pivot member 14 and the cap 18*a*, and the acting rod 181 is axially disposed through the positioning rod 18*b* such that the one end of an acting rod 181 protrudes from the positioning rod 18*b*. The rack portion 14*a*, with the push rod 28 acting as an axial, can move between a first position corresponding to the recess 180 where the rack portion 14*a* can drive the push rod 28, and a second position corresponding to where the rack portion 14*a* cannot drive the push rod 28. The pivot member 14 can swing the rack portion 14*a* at the first or second position by means of a rotation member 17 (e.g., a key) to facilitate the engagement or disengagement of a door bolt provided on the fire door.

Therefore, when the door bolt assembly 3 is actuated, the operation member 15 is rotated by the rotation member 17 coupled to the operation member 15 to drive the pivot member 14 and the rack portion 14*a* to rotate. At this time, the pivot member 14 is limited by the acting rod 181 and can only be displaced in the recess 180, such that the pivot member 14 swings the rack portion 14*a* at the first or second position.

In view of the above, the door bolt assembly 3 according to the present invention, by the pivot member 14 formed integrally with the rack portion 14*a*, strengthens the structural strength of the door bolt assembly 3, so that the problem of deformation or breakage of the rack portion 14*a* can be avoided when actuating the push rod 28.

The present invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A fire door lock mechanism, comprising:

a body mounted on a fire door and formed with a handlebar and a drive mechanism operationally associated with the handlebar, for allowing a user to depress the handlebar to disengage the fire door lock mechanism, wherein the body comprises:

a lock shell for accommodating components of the drive mechanism, a bottom of the lock shell being coupled to a mount plate and a base plate having two ends:

a handlebar mount having a recess for receiving the base plate;

a pair of first horseshoe elements, connected to opposite ends of the base plate;

a pair of second horseshoe elements, connected to opposite ends of a bottom of the handlebar;

a pair of actuators, each bent to form a central portion and two end portions, wherein one of the end portions of each actuator is connected to a respective one of the second horseshoe elements, and the central portion of each actuator is connected to a respective first horseshoe element, such that the actuators receive a force from the handlebar via the second horseshoe elements to rotate the actuators;

a push rod coupled to the other end portion of the actuators;

a glide mount coupled to one end of the push rod to receive motion from the push rod;

a lock bolt coupled to the glide mount to receive motion from the glide mount; and a door bolt assembly connected to another end of the push rod relatively far away from the glide mount, wherein the door bolt assembly comprises a carrier, a pivot member rotatably disposed on the carrier, an operation member penetrating through the pivot member, and a holding member disposed between the pivot member and the operation member, and wherein the pivot member is rotatably pivoted to the push rod by a rack portion integrally formed on the pivot member, wherein the carrier has a recess to accommodate one end of an acting rod disposed on the pivot member.

2. The mechanism of claim 1, wherein each of the actuators is bent by a right angle to form the central portion and two end portions, one of the end portions of each actuator being coupled to a bottom hole of a respective second horseshoe element, and the central portion of each actuator being coupled to a top hole of a respective first horseshoe element.

3. The mechanism of claim 1, wherein the push rod is in an elongated shape, with a pin being disposed at one end of the push rod for coupling the push rod to one of the end portions of the actuator, and one end of the push rod is connected with a link arm which receives motion from the push rod to generate a horizontal force.

4. The mechanism of claim 3, wherein the glide mount is coupled to one end of the link arm by a pin to receive the horizontal force from the link arm and generate a horizontal movement thereof.

5. The mechanism of claim 1, wherein a lock cover mount is coupled to the glide mount to receive the horizontal movement of the glide mount which horizontally moves back and forth inside the lock cover mount in accordance with the motion of the push rod.

6. The mechanism of claim 5, wherein an elliptic slot is formed at a side of the glide mount, allowing a pin to be inserted into the slot to couple the glide mount to the lock cover mount, and making the glide mount directed by the slot to move back and forth horizontally.

7. The mechanism of claim 5, wherein the lock bolt is coupled to the glide mount and the lock cover mount by a pin and is driven by the glide mount to move.

8. The mechanism of claim 5, wherein the glide mount is coupled to a partition which has an outwardly protruding arm and whose central portion is coupled to one end of an elastic member, the other end of the elastic member being secured to a pin disposed at a top of an inside of the lock cover mount, and the partition is coupled to the glide mount and the lock cover mount by a pin, making the partition move up and down along the pin.

9. The mechanism of claim 8, wherein when the partition moves upwards, a front end of the partition is in contact with a recess portion of the lock bolt, such that the lock bolt is not able to retract into the lock shell.

10. The mechanism of claim 8, wherein the arm of the partition abuts against one end of a pillar of a safety plate, the pillar being coupled to one end of an elastic member whose the other end is coupled to a pin which couples the safety plate and the glide mount to the lock cover mount and which protrudes from an arc-shaped opening of the safety plate, allowing the elastic member to generate a force to move the safety plate.

11. The mechanism of claim 10, wherein the safety plate is in a substantially triangular shape, and a pin is used to couple the safety plate and the lock bolt to the lock cover mount and connected with a coiled elastic member whose one end is coupled to a top of the lock cover mount and whose other end generates a force on the lock bolt.

12. The mechanism of claim 8, wherein the glide mount is formed with a fire piece made of a heat-melting material.

13. The mechanism of claim 12, wherein a bottom of the fire piece is formed with a protrusion having a slanted surface in contact with the arm of the partition to move the partition downwards and disengage the lock bolt.

14. The mechanism of claim 1, wherein each of the actuators has a recess portion bridged over the push rod; the central portion of each actuator is connected to a respective first horseshoe element by a pin inserted into a hole of the central portion and a hole at a top of the first horseshoe element; and one of the end portions of each actuator has a hole inserted with a pin which is further inserted into a hole of the push rod to couple the actuator to the push rod.

15. The mechanism of claim 1, wherein a protruding wing is formed at a central portion of the push rod for securing one end of an anti-push elastic member whose compression is released to generate a force on the push rod and move the push rod horizontally to an original starting position, and the other end of the anti-push elastic member is coupled to a stopper plate of one of the first horseshoe elements.

16. The mechanism of claim 1, wherein the pivot member is joined with a groove of the carrier by an elastic structure.

17. The mechanism of claim 1, wherein the holding member maintains axial extension of the operation member and the pivot member.

18. The mechanism of claim 1, wherein the pivot member swings the rack portion at a first position corresponding to the recess or a second position corresponding to the recess by means of a rotation member used to couple to the operation member.

19. The mechanism of claim 18, wherein the first position is where the rack portion drives the push rod, and the second position is where the rack portion is free from driving the push rod.

* * * * *